(12) United States Patent
Zhou et al.

(10) Patent No.: US 11,019,554 B2
(45) Date of Patent: May 25, 2021

(54) WIRELESS CHANNEL ACCESS RESTRICTIONS

(71) Applicant: Hewlett Packard Enterprise Development LP, Houston, TX (US)

(72) Inventors: Qiang Zhou, Beijing (CN); Jianpo Han, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 37 days.

(21) Appl. No.: 16/494,788

(22) PCT Filed: Apr. 14, 2017

(86) PCT No.: PCT/CN2017/080648
§ 371 (c)(1),
(2) Date: Sep. 17, 2019

(87) PCT Pub. No.: WO2018/188087
PCT Pub. Date: Oct. 18, 2018

(65) Prior Publication Data
US 2020/0015148 A1 Jan. 9, 2020

(51) Int. Cl.
*H04W 4/00* (2018.01)
*H04W 48/02* (2009.01)
(Continued)

(52) U.S. Cl.
CPC .......... *H04W 48/02* (2013.01); *H04B 7/0452* (2013.01); *H04L 5/0007* (2013.01);
(Continued)

(58) Field of Classification Search
CPC ... H04W 48/02; H04W 48/08; H04W 72/085; H04W 72/10
See application file for complete search history.

(56) References Cited

U.S. PATENT DOCUMENTS 9,049,670 B2    6/2015 Balachandran et al.
2005/0232284 A1* 10/2005 Karaoguz .............. H04W 4/18
                                                       370/401
(Continued)

FOREIGN PATENT DOCUMENTS

CN    101730105    6/2010
CN    102025461    4/2011
(Continued)

OTHER PUBLICATIONS

Haochao Li et al., "CUTS: Improving Channel Utilization in Both Time and Spatial Domain in 'WLANS," Jun. 2014, pp. 1-11, IEEE.
(Continued)

*Primary Examiner* — Elisabeth Benoit Magloire
(74) *Attorney, Agent, or Firm* — Hewlett Packard Enterprise Patent Department

(57) ABSTRACT

An example method of controlling a wireless access point may include associating accumulated-channel-resource-consumption variables with, respectively, resource consumers of the wireless access point. The method may further include, for wireless communications of the wireless access point determining a number of spatial streams effectively consumed by the respective wireless communication; determining an operational bandwidth effectively consumed by the respective wireless communication; determining a duration of the respective wireless communication; determining a channel-resource-consumption amount for the respective wireless communication based on the number of spatial streams effectively consumed by the respective wireless communication, the operational bandwidth effectively consumed by the respective wireless communication, and the duration of the respective wireless communication; and determining values for the accumulated-channel-resource-consumption variables by accumulating the channel-resource-consumption amounts per resource consumer. The (Continued)

method may further include determining whether to impose channel access restrictions on the resource consumers based on their respective accumulated-channel-resource-consumption variables.

15 Claims, 6 Drawing Sheets

(51) Int. Cl.
    *H04B 7/0452*     (2017.01)
    *H04L 5/00*     (2006.01)
    *H04W 48/08*     (2009.01)
    *H04W 72/08*     (2009.01)
    *H04W 72/10*     (2009.01)

(52) U.S. Cl.
    CPC ......... *H04W 48/08* (2013.01); *H04W 72/085* (2013.01); *H04W 72/10* (2013.01)

(56) References Cited

U.S. PATENT DOCUMENTS

| | | | |
|---|---|---|---|
| 2010/0061312 A1 | 3/2010 | Wang et al. | |
| 2011/0085513 A1 | 4/2011 | Chen et al. | |
| 2012/0314636 A1* | 12/2012 | Liu | H04W 28/065 370/311 |
| 2013/0163424 A1* | 6/2013 | Goerke | H04L 43/16 370/235 |
| 2013/0201863 A1* | 8/2013 | Chan | H04W 24/08 370/253 |
| 2013/0281105 A1* | 10/2013 | Ren | H04W 28/26 455/452.1 |
| 2014/0348097 A1* | 11/2014 | Park | H04L 1/0009 370/329 |
| 2015/0319693 A1* | 11/2015 | Kneckt | H04W 52/0209 370/311 |
| 2016/0173249 A1 | 6/2016 | Kwon et al. | |
| 2016/0315675 A1* | 10/2016 | Seok | H04L 1/1854 |
| 2016/0353322 A1* | 12/2016 | Li | H04W 74/004 |
| 2017/0188376 A1* | 6/2017 | Noh | H04W 72/046 |
| 2017/0325138 A1* | 11/2017 | da Silva | H04W 36/30 |
| 2018/0035467 A1* | 2/2018 | Kudo | H04W 4/00 |
| 2018/0248663 A1* | 8/2018 | Mueller | H04B 7/0452 |

FOREIGN PATENT DOCUMENTS

| | | |
|---|---|---|
| CN | 102255707 A | 11/2011 |
| CN | 104427537 | 3/2015 |
| WO | WO-2011029627 | 3/2011 |

OTHER PUBLICATIONS

International Searching Authority, The International Search Report and the Written Opinion, dated Jan. 11, 2018, PCT/CN2017/080648, 11 Pgs.

* cited by examiner

WIRELESS CHANNEL ACCESS RESTRICTIONS

BACKGROUND

A wireless channel may be used for conveying wireless communications between an access point and client devices. Various wireless communications techniques may be used to increase the number of distinct data signals that may be concurrently carried on the wireless channel between access point and client devices. For example, Multiple-Input-Multiple-Output (MIMO) techniques may utilize beamforming (spatial multiplexing) to transmit multiple distinct data signals concurrently on the same wireless channel to multiple receiver antennas via multiple transmitter antennas. In MIMO techniques, multiple "spatial streams" (e.g., one per transmit antenna) may be used to transmit the data signals concurrently, resulting in an aggregate radiation pattern ("transmit signal") that may be received at one or more client devices. The client device(s) may be able to differentiate the spatial streams in the transmit signal (and thus recover the multiple distinct data signals) by exploiting knowledge of the channel state. As another example, orthogonal-frequency-division (OFD) techniques may divide an available system bandwidth into multiple orthogonal frequency sub-bands and concurrently transmit multiple distinct data signals via the frequency sub-bands, respectively.

DETAILED DESCRIPTION

Figure 1:
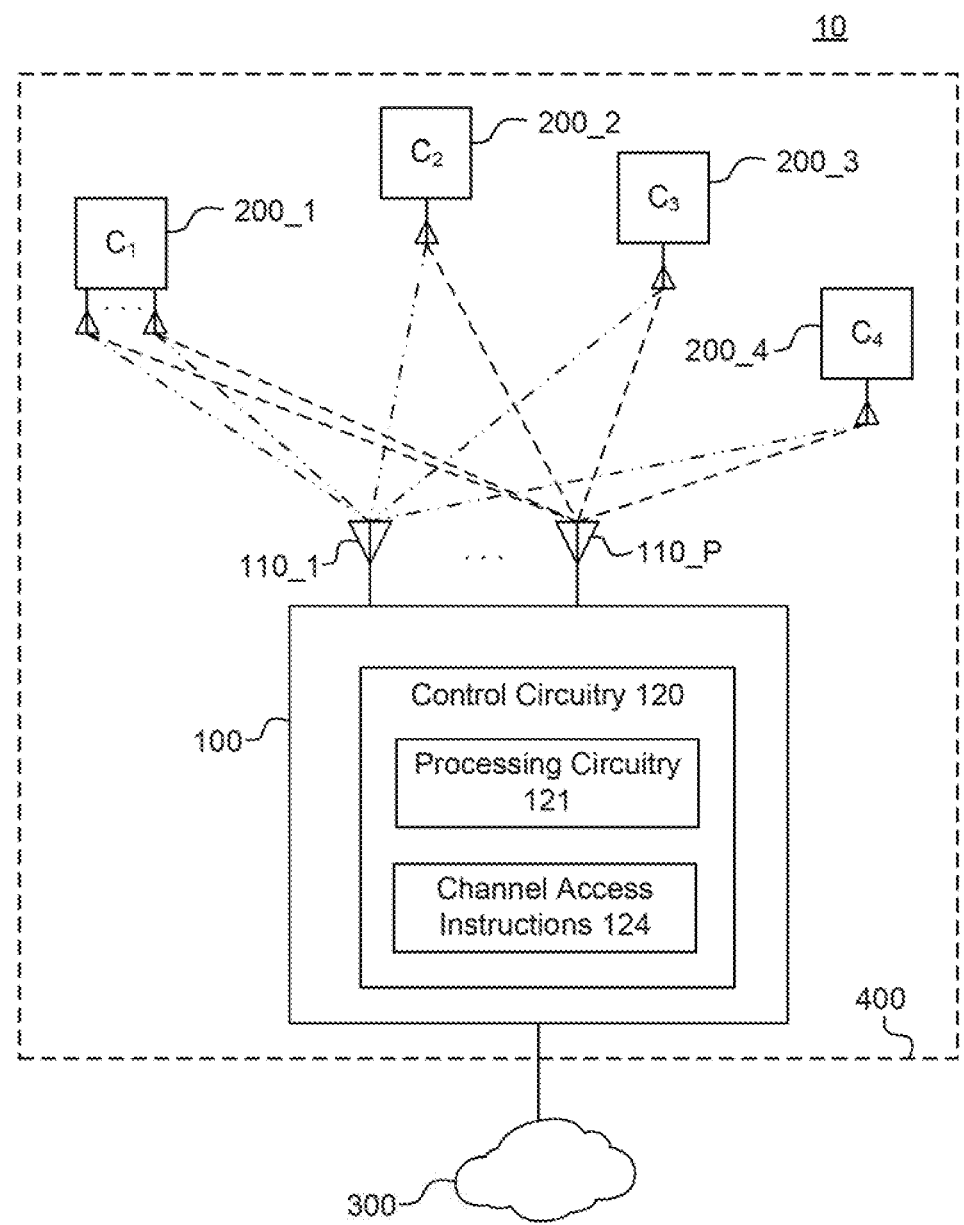
FIG. 1 is a block diagram illustrating an example system that includes an example wireless network with an example wireless access point and example client devices.

The MIMO and OFD techniques described above may include single user (aka single access) versions and multiple user (aka multiple access) versions. In the single user versions, multiple data signals for a single client device are transmitted concurrently, while in the multiple user versions data signals for multiple client devices are transmitted concurrently. Wireless networks that are capable of using a multiple-user version of MIMO or OFD techniques may be referred to herein as multi-user-concurrent-access wireless networks.

For example, MIMO techniques include Multi-User MIMO (MU-MIMO) techniques, in which the multiple data signals may be transmitted concurrently to multiple client devices via multiple spatial streams, the combined transmit signal comprising the multiple spatial streams may be received at each of the multiple client devices, and the client devices may each recover their own intended data signal from the combined transmit signal by exploiting knowledge of the wireless channel. MIMO techniques also include Single-User MIMO (SU-MIMO) techniques in which the multiple data signals may be transmitted concurrently to a single client device via multiple spatial streams, and the client device may recover the multiple data signals from the combined transmit signal by exploiting knowledge of the wireless channel.

As another example, OFD techniques include orthogonal-frequency-division-multiple-access (OFDMA) techniques, in which multiple data signals intended for multiple client devices may be included in the transmit signal by assigning one or more of the frequency sub-bands to each client device, and the client devices may each recover their own intended data signal(s) from the combined transmit signal by listening to their assigned frequency sub-band(s). OFD techniques may also include OFD Single-Access (OFDSA) techniques, in which multiple data signals intended for a single client device may be included in the transmit signal on respective frequency sub-bands, and the client device may recover the data signals from the combined transmit signal by listening to the frequency sub-bands.

When a wireless network includes multiple entities (e.g., client devices, virtual access points (VAPs), etc.) that would like to use the wireless channel (hereinafter "resource consumers"), it is possible that some of the resource consumers may use the wireless channel more than others do. For example, one or a few resource consumers (e.g., a client device that is streaming video) may monopolize the wireless channel, potentially resulting in degraded performance for other resource consumers. As another example, the resource consumers of the wireless network may include some client devices that are capable of utilizing more efficient communications technologies (e.g., MU-MIMO or OFDMA technologies) and some client device that use less efficient technologies, in which case the less-efficient client devices may use more of the channel resources of the wireless channel than the efficient client devices all other things being equal.

Thus, in certain contexts, it may be desired to enforce a channel access policy that specifies usage (consumption) limits or usage distributions for the wireless channel. A channel access policy may be defined by, among other things: (1) the type of usage limits/distributions that are specified in the channel access policy (e.g., equal usage, prioritized usage, etc.), and (2) a metric that is used to quantitatively measure usage (consumption) amounts of resource consumers according to the channel access policy.

As an example of usage limits/distributions, a channel access policy may specify that each resource consumer has an opportunity for equal usage (consumption) amounts of the wireless channel within a specified time period. As another example, a channel access policy may specify that each resource consumer has an opportunity for a usage amount within a specified time period that is allocated according to a prioritization policy. For example, higher priority resource consumers may be allocated more usage than lower priority resource consumers.

As an example of a metric that may be used to quantitatively measure usage (consumption) amounts of resource consumers, the duration of each wireless communication may be used as a metric (hereinafter "air time metric"). Such an air time metric may be adequate in example wireless networks in which the wireless channel carries a single data signal at a time. However, in example multi-user-concurrent-access wireless networks in which it is possible for multiple data signals to be carried on the same wireless channel concurrently to multiple client devices (e.g., MU-MIMO capable networks, OFDMA capable networks, etc.), such an air time metric may result in determining usage amounts that do not adequately reflect the actual usage of the wireless channel.

Thus, in examples described herein a new consumption metric for determining usage amounts of a wireless channel may be used, which may more accurately reflect actual usage of a wireless channel in a multi-user-concurrent-access capable wireless network. Specifically, in examples described herein, a channel-resource-consumption amount ("U") may be determined for a wireless communication based on: 1) the number ("N") of spatial streams effectively consumed by the communication, 2) the operational bandwidth ("W") effectively consumed by the communication, and 3) the duration ("T") of the communication. In other words, the consumption metric may define a relationship between the channel-resource-consumption amount U and the quantities N, W, and T. For example, the channel-resource-consumption amount for a given wireless communication may be equal to the number of spatial streams effectively consumed by the communication multiplied by the operational bandwidth effectively consumed by the communication multiplied by the duration of the communication. In such an example, the consumption metric may be given by the relation: $U=N \cdot W \cdot T$. Example channel access policies described herein that use this new consumption metric may be referred to hereinafter as "MA-aware channel access policies".

In example MA-aware channel access policies described herein, the consumption metric may be used to quantitatively measure usage amounts of the wireless channel by resource consumers. In particular, in certain examples, the channel-resource-consumption amount U may be determined according to the consumption metric for each wireless communication $S_i$ sent from and/or received by a wireless access point, and the channel-resource-consumption amounts U may be accumulated on a per-resource-consumer basis to track the usage of the resource consumers over time. The accumulation of the channel-resource-consumption amounts U per-resource-consumer may be accomplished, for example, by associating accumulated-channel-resource-consumption variables $\Sigma U$ with each resource consumer and then, for each wireless communication, adding the channel-resource-consumption amount U determined for the communication to the accumulated-channel-resource-consumption variable(s) $\Sigma U$ of the resource consumer(s) that is(are) associated with the communication. A desired limitation or distribution of usage amounts among the resource consumers may be enforced based on the accumulated-channel-resource-consumption variables $\Sigma U$. For example, if the accumulated-channel-resource-consumption variable XU of a given resource consumer exceeds an allocated consumption amount A for the given resource consumer within a specified time period, then channel access restrictions may be imposed on the given resource consumer (e.g., the resource consumer may be prevented from further communications during the remainder of the time period).

In the consumption metric described above, the number N of spatial streams that are "effectively consumed" by a given wireless communication for a given client device means the number ("$N_{actual}$") of spatial streams that were actually used by the given wireless communication plus the number ("$N_{blocked}$") of available spatial streams that were not used by the wireless communication but that the given communication prevented from being used. In other words, $N=N_{actual}+N_{blocked}$. For example, because MU-MIMO techniques allow for the available spatial streams of the wireless channel to be divided among multiple client devices, a MU-MIMO communication for a given client device does not prevent any of the available spatial streams from being used (i.e., $N_{blocked}=0$). Accordingly, the number N of spatial streams that are "effectively consumed" by a MU-MIMO communication is just the number $N_{actual}$ of spatial streams that are actually used by the communication (i.e., $N=N_{actual}+N_{blocked}=N_{actual}+0=N_{actual}$). On the other hand, because non-MU-MIMO techniques do not allow for multiple spatial streams to be divided among multiple client devices, a non-MU-MIMO communication for a given client device prevents all of the available spatial streams that are not being used by the non-MU-MIMO communication from being used (i.e., $N_{blocked}=N_{max}-N_{actual}$). Accordingly, the number N of spatial streams that are "effectively consumed" by a non-MU-MIMO communication is the total number $N_{max}$ of available spatial streams (i.e., $N=N_{actual}+N_{blocked}=N_{actual}+N_{max}-N_{actual}=N_{max}$).

In the consumption metric described above, the operational bandwidth effectively "effectively consumed" by a given wireless communication for a given client device means the bandwidth ("$W_{actual}$") actually used by the given wireless communication plus the remaining available bandwidth ("$W_{blocked}$") that was not used by the wireless communication but that the given communication prevented from being used. In other words, $W=W_{actual}+W_{blocked}$. For example, because OFDMA techniques allow for the available frequency sub-bands of the wireless channel to be divided among multiple client devices, an OFDMA communication for a given client device does not prevent any of the available bandwidth from being used (i.e., $W_{blocked}=0$). Accordingly, the bandwidth W "effectively consumed" by an OFDMA communication is just the bandwidth $W_{actual}$, actually used by the communication (i.e., $W=W_{actual}+W_{blocked}=W_{actual}+0=W_{actual}$). On the other hand, because non-OFDMA techniques do not allow for the available frequency sub-bands to be divided among multiple client devices, a non-OFDMA communication for a given client device prevents all of the available bandwidth that is not being used by the non-OFDMA communication from being used (i.e., $W_{blocked}=W_{max}-W_{actual}$). Accordingly, the bandwidth W "effectively consumed" by a non-OFDMA communication is the total operational bandwidth $W_{max}$ (i.e., $W=W_{actual}+W_{blocked}=N_{actual}+W_{max}-W_{actual}=W_{max}$).

Example MA-aware channel access policies described herein may be able to take into account differences in channel usage efficiency of different communications technologies, which may result in determinations of usage amounts that adequately reflect the actual usage of the wireless channel. For example, because example MA-aware channel access policies measure usage not only in terms of duration of communications, but also in terms of bandwidth and spatial streams effectively consumed by the communications, differences between communications technologies in the efficiency with which they consume bandwidth and spatial streams may be taken into account in determining the usage distribution. For example, MU-MIMO communications and OFDMA communications may consume spatial streams and bandwidth more efficiently than non-MU-MIMO communications and non-OFDMA communications, respectively, and these differences in efficiency are accounted for in example MA-aware channel access policies. Thus, the example MA-aware channel access policies may be particularly well suited to multi-user-concurrent-access wireless networks (e.g., MU-MIMO capable networks, OFDMA capable networks, etc.).

Moreover, example MA-aware channel access policies may, in certain circumstances, be preferable to channel access policies in which usage is measured purely in terms of the duration of communications (hereinafter "air time channel access policies"). In particular, in example MA-aware channel access policies, communications that effectively consume different numbers of spatial streams or different amounts of bandwidth may be determined to have different usage amounts, while in air time channel access policies these communications may be determined to have the same usage amounts. Thus, in certain circumstances, the determined consumption amounts of the MA-aware channel access policies better reflect the actual consumption of the channel resource.

For example, consider two clients of a wireless network that is MU-MIMO capable: a first client that is not MU-MIMO capable, and a second client that is MU-MIMO capable. Suppose that both the first client and the second client have a same number of wireless communications of a same duration within a given time period. In such a scenario, the first client has actually consumed more of the channel resource than the second client (even though they have had the same number of communications with the same durations), because each non-MU-MIMO communication of the first client effectively consumes all of the spatial streams of the wireless channel, while each MU-MIMO communication of the second client consumes less than all of the spatial streams of the wireless channel and leaves open the remaining spatial streams for other clients to consume. According to example MA-aware channel access policies, a larger usage amount would be determined for the first client than is determined for the second client, which correctly reflects the actual usage, because the metric used to measure usage amounts takes into account the effective consumption of spatial steams. However, under an air-time channel access policy, the same usage amount would be determined for both the first and second clients, which does not correctly reflect the actual usage. The inaccurate usage determinations under an air-time channel access policy may result in penalizing more efficient clients, resulting in inefficient usage distributions. [Example System]

FIG. 1 illustrates an example system 10. The example system 10 includes a wireless access point 100, client devices 200 (e.g., client devices 200_1-200_4), and an external network 300. The wireless access point 100 wirelessly communicates with the client devices 200, and may provide a connection between the client devices 200 and the external network 300.

In particular, the wireless access point 100 includes control circuitry 120 that may cause the wireless access point 100 to perform certain operations described herein. The control circuitry 120 may include processing circuitry 121 and channel access instructions 124, which when executed by the processing circuitry 121 may cause the control circuitry 120 to perform processes for implementing MA-aware channel access policies described herein.

The client devices 200 may be any electronic devices that are capable of wirelessly communicating with the wireless access point 100 via any communications protocol. For example, the client devices 200 may include mobile phones, tablets, laptop computers, personal-digital-assistants (PDAs), smart devices (e.g., smartphones, tablets, smart watches, smart bands, smart glasses, etc.), Bluetooth devices, internet-of-things (IoT) embedded devices, networking devices (e.g., wireless extenders, wireless bridges, etc.), and so on.

The network 300 may be any wired or wireless network, such as, for example, a local area network (LAN), a wide area network (WAN), the internet, a telecommunications backhaul network (such as an Evolved Universal Mobile Telecommunications System Terrestrial Radio Access Network (E-UTRAN) in an LTE network), a telecommunications core network (such as an Evolved Packet Core in an LTE network), and so on. The wireless access point 100 and client devices 200 that are connected thereto may be referred to herein as a wireless network 400. [Example Wireless Access Point]

Figure 2:
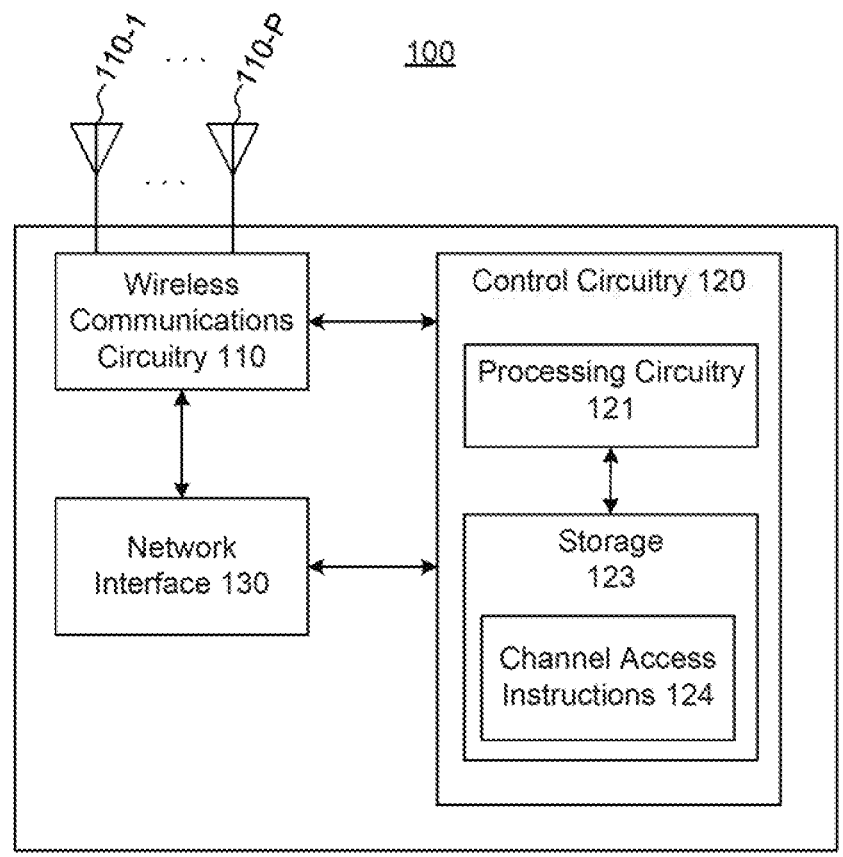
FIG. 2 is a block diagram illustrating an example wireless access point.

FIG. 2 illustrates an example wireless access point 100. The wireless access point 100 may be any MU-MIMO capable and/or OFDMA capable communications device that is to act as an access point for a client device 200. Specifically, the wireless access point 100 may allow client devices 200 that are wirelessly connected thereto to communicate with one another and/or an external network (such as the network 300) via various communications standards. As used herein, "access point" (AP) refers generally to transmitting and/or receiving points for any known or convenient wireless access technology which is now or may later become known. Specifically, although the term "access point" may include IEEE 802.11-based access points, the term access point is not intended to be limited solely to IEEE 802.11-based access points. For example, the wireless access point 100 may be a Wi-Fi access point (such as an IEEE 802.11ac access point), a cellular communications base station (such as an eNodeB in a Long Term Evolution (LTE) network), a WiMAX base station (such as an IEEE 802.16e base station), and the like.

The wireless access point 100 may include wireless communications circuitry 110, control circuitry 120, and a network interface 130. The wireless communications circuitry 110 may wirelessly transmit messages to the client devices 200. The wireless communications circuitry 110 may also receive messages wirelessly transmitted from the client devices 200. The network interface 130 may connect the wireless access point 100 to a network, such as the network 300. The control circuitry 120 may control the wireless communications circuitry 110. The control circuitry 120 may also control the network interface 130.

The wireless communications circuitry 110 includes P antennas 111 (111-1 through 111-P), where P is an integer equal to or greater than one. The antennas 111-1 through 111-P may transmit and/or receive signals in the form of electromagnetic radiation. Any portion of the electromagnetic spectrum may be used to transmit/receive messages. A transport protocol adopted by the wireless access point 100 may specify a particular portion of the electromagnetic spectrum for transmission/reception (for example, IEEE 802.11 ac specifies a 5 Ghz band).

The wireless communications circuitry 110 may transmit in various modes, including, for example, a MU-MIMO mode, an OFDMA mode, a single-user MIMO (SU-MIMO) mode, a single-input-single-output (SISO) mode, a multiple-input-single-output (MISO) mode, an OFD single-access (OFDSA) mode, etc. For example, a transmission mode may be selected depending on a type of communication technology that a target client device 200 is capable off using. In MU-MIMO mode, the wireless communications circuitry 110 may transmit up to P spatial streams having distinct data concurrently via the antennas 111-1 through 111-P using beamforming techniques, with the spatial streams being intended for multiple client devices 200. In SU-MIMO mode, the wireless communications circuitry 110 may transmit up to P spatial streams having distinct data concurrently via the antennas 111-1 through 111-P using beamforming techniques, with the spatial streams all being intended for the same client device 200. In SISO mode, the wireless communications circuitry 110 may communicate a single data stream via one of the antennas 111-1 through 111-P. In MISO mode, the wireless communications circuitry 110 may transmit multiple spatial streams having the same data concurrently via multiple of the antennas 111-1 through 111-P (perhaps with directional beamforming to focus the signal at the target client device 200). In OFDMA mode, the wireless communications circuitry 110 may transmit multiple data signals concurrently via multiple orthogonal frequency sub-bands of the wireless channel, respectively, with the data signals being intended for multiple client devices 200. In OFDSA mode, the wireless communications circuitry 110 may transmit multiple data signals concurrently via multiple orthogonal frequency sub-bands of the wireless channel, respectively, with the data signals all being intended for the same client device 200. The wireless communications circuitry 110 may also combine the OFDMA or OFDSA modes with any of the MU-MIMO, SU-MIMO, SISO, and MISO modes.

The wireless communications circuitry 110 may generate the spatial streams for transmission by packaging messages that are to be transmitted into transmission frames (e.g., MAC and PHY framing) according to the wireless transmission protocol adopted by the wireless access point 100, mapping the transmission frames to transmission symbols according to a modulation scheme and modulating a carrier signal based on the transmission symbols, and wirelessly transmitting the modulated signals via amplifiers and the antennas 111-1 through 111-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation schemes; for example, IEEE 802.11ac specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using beamforming techniques. The precoding weights may be determined by the control circuitry 120.

The wireless communications circuitry 110 may also receive wireless transmissions from client devices via the antennas 111-1 through 111-P, and may demodulate the received signals via demodulation circuitry to obtain reception frames. The wireless communications circuitry 110 may receive MU-MIMO, SU-MIMO, SISO, MISO, OFDMA, and/or OFDSA communications. Reception frames whose respective payloads are intended to go to the network 300 (e.g., data plane messages) may be sent to the network 300 via the network interface 130, while reception frames that include control plane messages may be sent to the control circuitry 120 for processing.

The control circuitry 120 may be to perform operations described herein in relation to example processes for implementing example MA-aware channel access policies. In addition, the control circuitry 120 may also control the operations of the wireless communications circuitry 110 and/or the network interface 130. The control circuitry 120 may also determine precoding weights to be applied to the transmission streams based on beamforming techniques. For example, each client device 200 may send to the wireless access point 100 beamforming feedback that includes information describing the state of the client device 200's channel, and the control circuitry 120 may use the beamforming feedback to generate a steering matrix (which is an example of the precoding weights). The steering matrix may then be applied to the transmission streams. The control circuitry 120 may also generate control plane messages to be sent to client devices 200 via the wireless communications circuitry 110, and may process control plane messages received from client devices 200.

The control circuitry 120 may also create virtual access points (VAPs) (not illustrated), to which some or all of the client device 200 may be connected. VAPs are logical (virtual) access point instances that exist on the same physical access point. VAPs may appear to client devices as independent access points; for example, in an 802.11 wireless network each VAP may have its own unique service set identifier (SSID). However, the VAPs may share physical hardware (e.g., antennas, etc.) of the physical access point on which they reside. For example, the VAPs may be virtualized entities created by the processing circuitry 121 that may act and appear to client device 200 as independent access points, but the VAPs may share the wireless communication circuitry 110 (and other hardware) under the control of the control circuitry 120.

The control circuitry 120 may include any combination of hardware and stored machine-readable instructions. In particular, the control circuitry 120 may include processing circuitry 121, which may be any combination of circuitry that is configured to perform the operations that are described herein in connection with the control circuitry 120. In particular, the processing circuitry 121 may include one or more processors that are capable of executing machine-readable instructions, such as central processing units (CPUs), microprocessors, microcontrollers, digital signal processors (DSPs), field-programmable gate arrays (FPGAs), application-specific instruction set processors (ASIPs), etc. The processing circuitry 121 may be formed (in whole or in part) by such a processor executing machine-readable instructions. Such machine readable instructions may be stored, for example, in the storage 123. In certain examples, the processing circuitry 121 may also include additional components that may support the processors and/or provide additional functionality, such as caches, coprocessors, timing sources, etc. The processing circuitry 121 may also include dedicated circuitry to perform one, some, or all of the operations described herein in connection with the control circuitry 120. Examples of such dedicated circuitry may include application-specific integrated circuits (ASICs), complex programmable logic devices (CPLD), and so on. In certain examples, some or all of such additional hardware components may be integrated into a same integrated circuit as the processor; for example, the processing circuitry 121 may be a system-on-chip (SoC).

Figure 3:
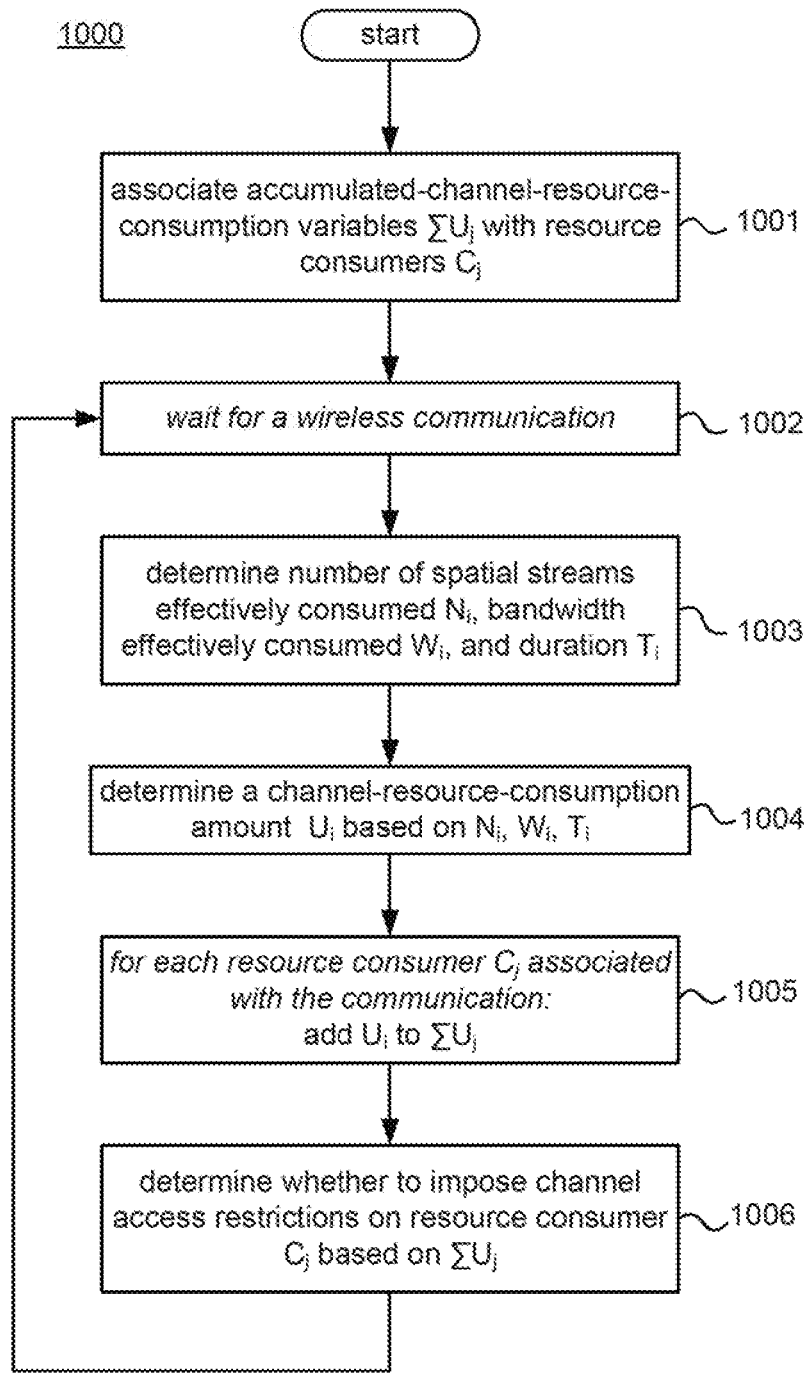
FIG. 3 is a process flow diagram illustrating an example process for implementing an example multiple-access-aware channel access policy.
Figure 4:
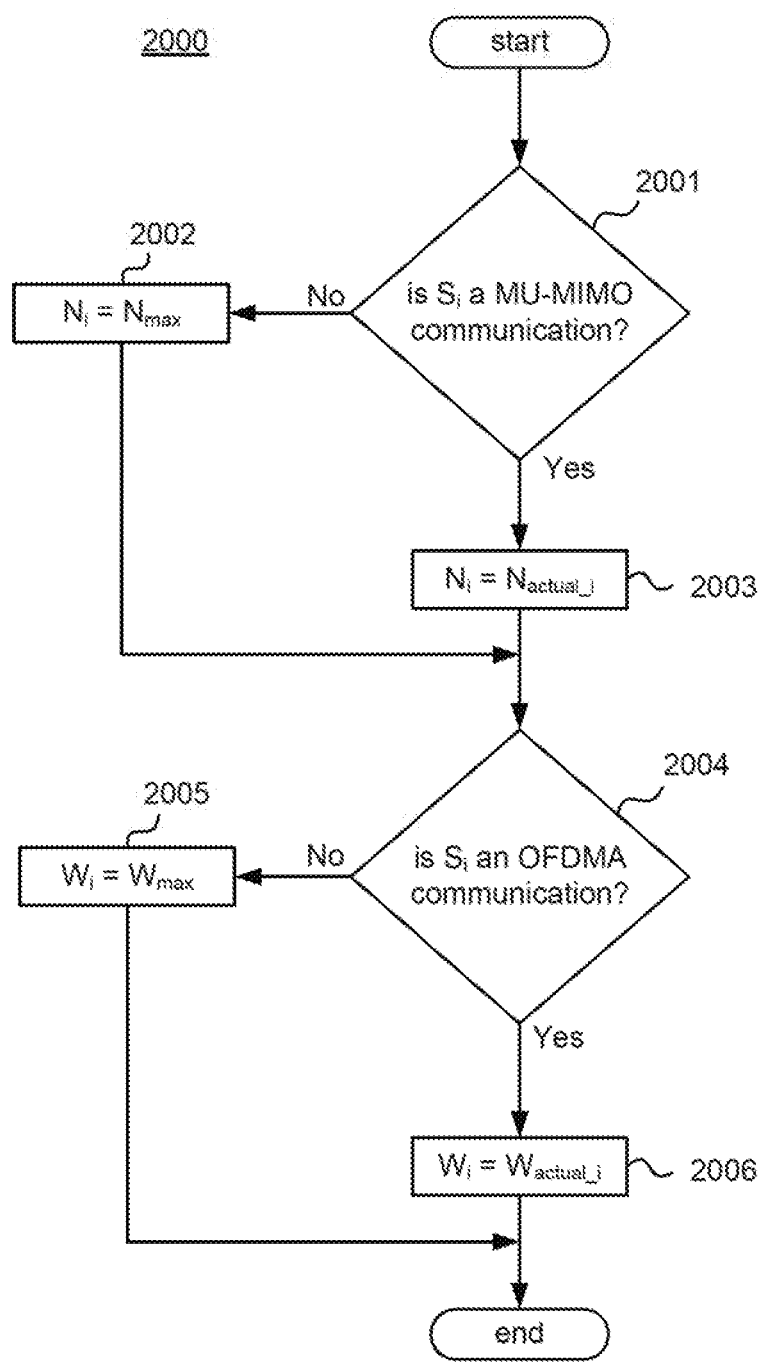
FIG. 4 is a process flow diagram illustrating an example process for determining a number of spatial streams effectively consumed by a wireless communication and an operational bandwidth effectively consumed by the communication.
Figure 5:
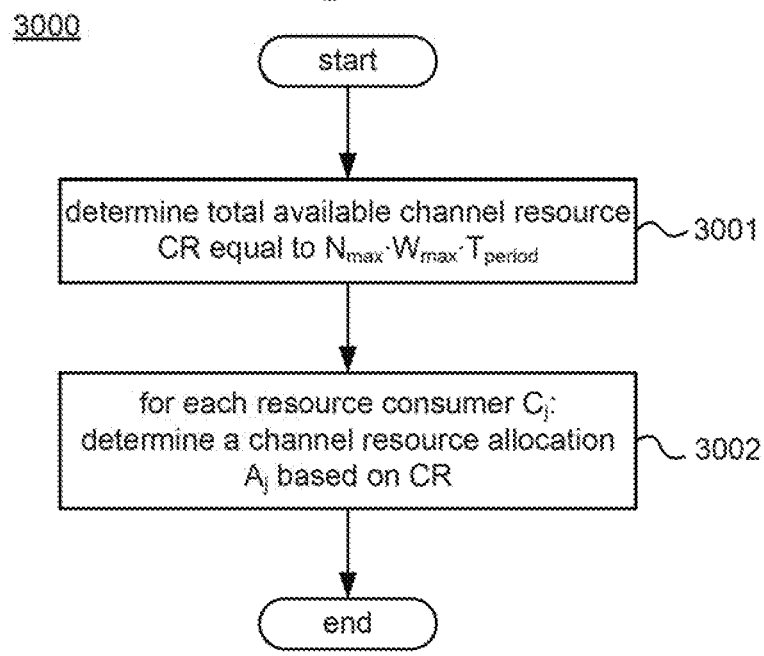
FIG. 5 is a process flow diagram illustrating an example process for determining channel resource allocations for resource consumers.

Specifically, the processing circuitry 121 may be configured to cause the wireless access point 100 to perform the operations described herein in connection with example processes for implementing example MA-aware channel access policies, such as the example operations illustrated in FIG. 3-5. For example, the control circuitry 120 may include a processor that is caused to perform some or all of these MA-aware channel access operations by executing channel access instructions 124. The processing circuitry 121 may also include one or more dedicated hardware elements, in addition to the processor, that are configured to perform some or all of these MA-aware channel access operations.

The channel access instructions 124 may be machine-readable instructions stored, for example, in the storage 123. The storage 123 may be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). The channel access instructions 124 may include instructions to perform some or all of the operations illustrated in FIGS. 3-5. For example, the channel access instructions 124 may include the channel access instructions 4010, which are described below in relation to FIG. 6. In examples in which the control circuitry 120 is constituted entirely by dedicated circuitry, the storage 123 and the channel access instructions 124 may be omitted.

The network interface 130 connects the wireless access point 100 to a network, such as the network 300. The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated/described separately, this is merely for ease of explanation and does not imply that these components are necessarily physically or logically separated. For example, the wireless communications circuitry 110 and the control circuitry 120 may share one or more of the same processors and/or ASICs, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

[Example Processes for MA-Aware Channel Access Policies]

FIG. 3 illustrates an example process 1000 for implementing an example MA-aware channel access policy. The example process 1000 may be performed by processing circuitry of a wireless access point (such as the processing circuitry 121). For example, the processing circuitry may perform the process 1000 as a result of executing channel access instructions (such as the channel access instructions 124 or 4010).

In the description below, "wireless communications" are referred to. As used herein, each "wireless communication" corresponds to a single client device and a single transmission unit (e.g., frame) of a wireless transmission signal, and includes all of the data signals in the corresponding transmission unit that are associated with the corresponding client device. Thus, for example, if a given transmission frame includes three data signals for three different client devices, respectively, then the transmission frame includes three distinct "wireless communications" that each comprise one of the data signals. As another example, if a given transmission frame includes three data signals that are all for a single client device, then the transmission frame includes one "wireless communication" that comprises all of the data signals.

In block 1001, the processing circuitry may associate accumulated-channel-resource-consumption variables $\Sigma U_j$ with, respectively, resource consumers $C_j$ of the wireless access point. In this context, j is an index that is used to identify resource consumers, such that the variable $\Sigma U_1$ is associated with the resource consumer $C_1$, the variable $\Sigma U_2$ is associated with the resource consumer $C_2$, and so on. The accumulated-channel-resource-consumption variable $\Sigma U_j$ of a resource consumer $C_j$ may represent a total amount of usage of the wireless channel for the resource consumer $C_j$ since the start of a current measurement time period. The processing circuitry may periodically reset the accumulated-channel-resource-consumption variables $\Sigma U_j$ to zero at the start of each measurement time period. After block 1001, the process 1000 may continue to block 1002.

In block 1002, the processing circuitry may wait for a wireless communication $S_i$ to occur at the wireless access point. The notation "$S_i$" may be used herein to refer to wireless communications, and the index "i" may be used to identify a particular wireless communication. Upon a wireless communication $S_i$ occurring, the process 1000 may continue to block 1003.

In certain examples, block 1002 may be triggered and the process may continue to block 1003 in response to specific types of wireless communications $S_i$ but not for other types of wireless communications $S_i$. For example, block 1002 may be triggered by wireless communications $S_i$ that are transmitted from the access point to client device (e.g., "downlink" communications), but not by wireless communications $S_i$ that are received by the access point from client device (e.g., "uplink" communications), or vice-versa. As another example, block 1002 may be triggered by wireless communications $S_i$ carrying user data (e.g., "data plane" communications), but not by wireless communications $S_i$ carrying signaling or control information (e.g., "control plane" communications), or vice-versa. As another example, wireless communications $S_i$ associated with specific resource consumers or classes of resource consumers may be explicitly excluded from triggering block 1002, such as, for example, a privileged resource consumer whose usage is not to be tracked. In other examples, block 1002 may be triggered by any type of wireless communication $S_i$.

In block 1003, the processing circuitry may determine the number $N_i$ of spatial streams effectively consumed by the communication $S_i$, the operational bandwidth $W_i$ effectively consumed by the communication $S_i$, and the duration $T_i$ of the communication $S_i$. The process 1000 may then continue to block 1004.

In block 1004, the processing circuitry may determine a channel-resource-consumption amount $U_i$ for the communication $S_i$, based on $N_i$, $W_i$, and $T_i$. In other words, the processing circuitry may determine the amount $U_i$ based on a consumption metric that may define a relationship between the channel-resource-consumption amount $U_i$ and the quantities $N_i$, $W_i$, and $T_i$. For example, $U_i$ may be determined by the consumption metric:

$$U_i = N_i \cdot W_i \cdot T_i \qquad \text{(eq. 1)}$$

The process 1000 may then proceed to block 1005.

In block 1005, the processing circuitry may add the channel-resource-consumption amount $U_i$ for the communication $S_i$ to the respective accumulated-channel-resource-consumption variables $\Sigma U_i$ of resource consumers $C_j$ that are associated with the communication $S_i$. In other words, block 1005 may include the following operation:

for (each j such that $C_j$ is associated with $S_i$):

$$\Sigma U_j \rightarrow \Sigma U_j + U_i$$

end for.

Thus, values may be determined for the accumulated-channel-resource-consumption variables $\Sigma U_j$ by accumulating, on a per-resource-consumer C basis, the channel-resource-consumption amounts $U_i$. As noted above, in general resource consumers may include, for example, client devices and/or VAPs. Specifically, in certain examples, for purposes of the process 1000, client devices may be considered to be resource consumers, and therefore $U_i$ may be added to the variable $\Sigma U_j$ of the client device associated with the communication $S_i$. Moreover, in certain examples, for purposes of the process 1000, VAPs may be considered to be resource consumers (in addition to or in lieu of client devices), and therefore $U_i$ may be added to the variable $\Sigma U_j$ of any VAP that is associated with a communication $S_i$ (if there is one). For purposes of block 1005, a VAP may be associated with any wireless communication $S_i$ of any client device that is connected to the VAP. Whether client devices, VAPs, or both are considered to be resource consumers $C_j$ for purposes of the process 1000 may depend on a policy set in the wireless access point, which may control whether usage is tracked on a per-client-device basis, a per-VAP basis, or both per-client-device and per-VAP basis. The process 1000 may then proceed to block 1006.

In block 1006, the processing circuitry may determine whether to impose channel access restrictions on the resource consumer $C_j$ based on the accumulated-channel-resource-consumption variables $\Sigma U_j$ associated therewith. For example, the processing circuitry may determine a channel resource allocation amount $A_j$ for each of the resource consumers $C_j$, and may determine whether or not to impose channel access restrictions on the resource consumers $C_j$ based on how their respective accumulated-channel-resource-consumption variables $\Sigma U_j$ compare to their respective channel resource allocations A. For example, any resource consumer $C_j$ whose accumulated-channel-resource-consumption variable $\Sigma U_j$ exceeds their channel resource allocation $A_j$ may have channel access restrictions imposed thereon. One example of how the channel resource allocation amounts $A_j$ may be determined is illustrated in FIG. 5 and described below.

In addition to being based on accumulated-channel-resource-consumption variables $\Sigma U_j$, the imposition of channel access restrictions may also be contingent upon certain conditions, such as, for example, whether or not the wireless channel is currently congested. For example, even if a given resource consumer $C_n$ has exceeded its resource consumption allotment $A_n$, if there are currently no other resource consumers $C_j$ that are seeking to use the wireless channel (e.g., congestion is low), then it may be desirable to avoid imposing restrictions on the resource consumer $C_n$. Channel access restrictions may be any restrictions on channel access, such as, for example, preventing all communications for the resource consumer until a next measurement period begins, limiting a number and/or size and/or frequency of communications for the resource consumer until a next measurement period begins, decreasing a priority level or QoS associated with a resource consumer, and so on.

FIG. 4 illustrates an example process 2000 for determining the number $N_i$ of spatial streams effectively consumed and the bandwidth $W_i$ effectively consumed by a wireless communication $S_i$. The process 2000 may be performed as a part of a process for implementing an example MA-aware channel access policy (such as the example process 1000). For example, the process 2000 may be performed as part of block 1003 of the process 1000. The example process 2000 may be performed by processing circuitry of a wireless access point (such as the processing circuitry 121). For example, the processing circuitry may perform the process 2000 in response to channel access instructions (such as the channel access instructions 124 or 4010) being executed.

In block 2001, the processing circuitry may determine whether the wireless communication $S_i$ is a MU-MIMO communication. A wireless communication $S_i$ is a MU-MIMO communication if the transmission signal that contains the communication $S_i$ was a MU-MIMO signal (i.e., a signal generated according to a MU-MIMO technique). For example, if the wireless communication $S_i$ is transmitted by the wireless access point operating in a MU-MIMO mode, then the communication $S_i$ is a MU-MIMO communication $S_i$. If $S_i$ is not a MU-MIMO communication, then the process continues to block 2003. If $S_i$ is a MU-MIMO communication, then the process continues to block 2004.

In block 2002, the number $N_i$ of spatial streams effectively consumed by the communication $S_i$ is set to the maximum number NM of spatial streams for the access point. The maximum number $N_{max}$ of spatial streams for the access point is the maximum number of spatial streams that it would be possible for the access point to concurrently generate in a MU-MIMO transmission mode. For example, the maximum number $N_{max}$ of spatial streams may be equal to the number of antennas the access point has (e.g., $N_{max}=P$ for the example wireless access point 100). After block 2002, the process 2000 may continue to block 2004.

In block 2003, the number $N_i$ of spatial streams effectively consumed by the communication $S_i$ is set to the number $N_{actual\_i}$ of spatial streams actually used by the communication $S_i$. The number $N_{actual\_i}$ of spatial streams actually used by the communication $S_i$ is the number of spatial streams included in the transmission signal that carried data signals for the client device associated with the communication $S_i$. After block 2003, the process 2000 may continue to block 2004.

In block 2004, the processing circuitry may determine whether the wireless communication $S_i$ is an OFDMA communication. A wireless communication $S_i$ is an OFDMA communication if the transmission signal that contains the communication $S_i$ was an OFDMA signal (i.e., a signal generated according to an OFDMA technique). For example, if the wireless communication $S_i$ is transmitted by the wireless access point operating in an OFDMA mode, then the communication $S_i$ is an OFDMA communication $S_i$. If $S_i$ is not an OFDMA communication, then the process continues to block 2005. If $S_i$ is an OFDMA communication, then the process continues to block 2006.

In block 2005, the bandwidth $W_i$ effectively consumed by the communication $S_i$ is set to a maximum operation bandwidth $W_i$ of the access point. The process 2000 may then end.

In certain examples, the maximum operational bandwidth $W_{max}$ of the access point may be the maximum bandwidth that the wireless access point can possibly use for the particular wireless channel in question (each wireless channel may have a different $W_{max}$. Because it may be possible for the bandwidth setting that is actually set in the access point for the wireless channel at any given time to be lower than the highest possible setting, it is possible in such examples that $W_{max}$ may be higher than a current bandwidth setting of the access point. For example, if the wireless access point has a maximum possible setting of 40 MHz for a wireless channel, then in certain examples $W_{max}$ may be equal to 40 MHz MHz (the highest possible bandwidth setting), even if the access point is currently set to operate with a 20 MHz bandwidth.

In certain other examples, the maximum operational bandwidth $W_{max}$ of the access point may be the bandwidth setting that is currently set in the access point for the wireless channel. Because it may be possible for the bandwidth setting for the wireless channel that is actual set in the access point at any given time to be lower than the highest possible bandwidth setting, in such examples it may be possible for $W_{max}$ to be lower that a theoretical maximum bandwidth setting that the access point is capable of. For example, if 20 MHz is currently set in the wireless access point as the bandwidth for the wireless channel, then in certain examples $W_{max}$ may be equal to 20 MHz (the bandwidth setting that is currently set), even if it were possible to set the access point to operate with 40 MHz bandwidths for the wireless channel.

In certain examples, it may be possible for a bandwidth setting in the access point to allow multiple possible bandwidths to be dynamically selected by the access point, for example, based on the capabilities of the client devices being communicated with. For example, the access point may have a 40 MHz/20 MHz setting that allows the access point to select a bandwidth of 40 MHz if the client devices being communicated with are 40 MHz capable, or select a bandwidth of 20 MHz otherwise. In some such examples, the maximum operational bandwidth $W_{max}$ of the access point may be the highest bandwidth allowed by the bandwidth setting for the wireless channel that is currently set in the access point, even if that is not the bandwidth at which the access point is currently operating. For example, if a current bandwidth setting allows 40 MHz or 20 MHz bandwidths, then in certain examples $W_{max}$ may be equal to 40 MHz (the highest available bandwidth of the current settings).

In certain other examples, the maximum operational bandwidth $W_{max}$ of the access point may be the highest possible bandwidth for the wireless channel in view of both the current configuration settings of the wireless access point and the capabilities of the client devices currently connected thereto. For example, if the highest possible bandwidth for the wireless channel that can be set in the wireless access point is 60 MHz bandwidth, and if the access point is currently set to such that 40 MHz is the maximum bandwidth for a wireless channel, but a highest channel bandwidth that is supported by any of the client devices connect to the access point is 20 MHz, then in certain examples $W_{max}$ may be equal to 20 MHz (the highest bandwidth that is actually possible in view of current settings and resource consumer capabilities).

In block 2006, the bandwidth $W_i$ effectively consumed by the communication $S_i$ is set to the bandwidth $W_{actual\_i}$ actually used by the communication $S_i$. The bandwidth $W_{actual\_i}$ actually used by the communication $S_i$ may be, for example, the sum of the bandwidths of each frequency sub-band in the transmission signal that carries a data signal for the client device that is associated with the communication $S_i$. In other words, $$W_{actual\_i} = \sum_{k: f_k \in S_i} w_k \quad \text{(eq. 2)}$$

where $w_k$ is the bandwidth of the frequency sub-band $f_k$ and the summation is over all values of k for which $f_k$ is included in the communication $S_i$ (i.e., the summation is over all values of k for which $f_k$ carries a data stream that is for the client device that is associated with $S_i$). The process 2000 may then end.

For example, suppose a single OFDMA transmission signal includes frequency sub-bands f1-f3 carrying data signals for client device $C_1$, frequency sub-bands f4-f5 carrying data signals for client device $C_2$, and frequency sub-band f6 carrying a data signal for client device $C_3$. In this example, the OFDMA transmission signal includes three OFDMA wireless communications $S_i$: a first wireless communication $S_i$ associated with client device $C_1$ (which includes sub-bands f1-f3), a second wireless communication $S_2$ associated with client device $C_2$ (which includes sub-bands f4-f5), and a third wireless communication $S_3$ associated with client device $C_3$ (which includes sub-band f6). Because each of the communications $S_1$-$S_3$ is an OFDMA communication, the bandwidths $W_1$-$W_3$ effectively consumed by the communications $S_1$-$S_3$ are the actual bandwidths consumed, respectively. Thus, applying equation 2, the bandwidth $W_1$ effectively consumed by communication $S_1$ is $W_1 = w_1 + w_2 + w_3$, the bandwidth $W_2$ effectively consumed by communication $S_2$ is $W_2 = w_4 + w_5$, and the bandwidth $W_3$ effectively consumed by communication $S_3$ is $W_3 = w_6$.

FIG. 5 illustrates an example process 3000 for determining channel resource allocations for resource consumers. The process 3000 may be performed as a part of a process for implementing an example MA-aware channel access policy (such as the example process 1000). For example, the process 3000 may be performed as part of block 1006 of the process 1000. The example process 3000 may be performed by processing circuitry of a wireless access point (such as the processing circuitry 121). For example, the processing circuitry may perform the process 3000 in response to channel access instructions (such as the channel access instructions 124 or 4010) being executed.

In block 3001, the processing circuitry may determine a total available channel resource ("CR"). The total available channel resource CR may represent a maximum possible usage amount for the wireless channel over a channel access measurement period. For example, the total available channel resource CR may be given by.

$$CR = N_{max} \cdot W_{max} \cdot T_{period} \quad \text{(eq. 3)}$$

where $T_{period}$ is the duration of the channel access measurement period. The process 3000 may then continue to block 3002.

In block 3002, the processing circuitry may determine a channel resource allocation $A_j$ for resource consumers $C_j$ based on the total available channel resource CR. For example, the channel resource allocations $A_j$ may be fractional proportions of the total available channel resource CR.

In certain examples, $A_j$ may be determined for a subset of resource consumers. For example, an allocation $A_A$ may be determined for each VAP, but not for client devices. As another example, an allocation $A_j$ may be determined for each client device, but not for VAPs.

In certain examples, $A_j$ may be determined for each resource consumer $C_j$, including both client devices and VAPs. In examples in which allocations $A_j$ are determined for each client device and for each VAP, the allocations $A_j$ may be determined separately for VAPs and client devices.

For example, in MA-aware channel access policies that include a prioritized usage policy, the size of each channel resource allocation $A_j$ may be determined based on a priority value $R_j$ associated with the resource consumer $C_j$. The priority value $R_j$ may be any value greater than 0. In some examples, the priority values $R_j$ may be integer values, but in other examples the priority values $R_j$ may be any real number. In certain examples, the priority values $R_j$ may be set, for example, by a network administrator. In other examples, the processing circuitry of the wireless access point may be configured to automatically set priority values $R_j$ for resource consumers C. For example, priority values $R_j$ may be set for resource consumers based on their respective communications capabilities (or in the case of VAPs, based on the communications capabilities of client devices connected thereto); for example, client devices that are MU-MIMO and/or OFDMA capable may be given higher prioritizations than devices that are not capable of MU-MIMO or OFDMA communications. As another example, higher prioritizations may be given to preferred resource consumers, such as those that subscribe to a particular service. As another example, prioritizations may be set for resource consumers based on the type(s) of communications the client devices are currently engaging in (or have recently engaged in).

For example, in a prioritization scheme in which higher priority values $R_j$ indicate higher prioritizations, then the channel resource allocation $A_j$ for each of the resource consumers $C_j$ may be equal to total available channel resource CR multiplied by the priority value $R_j$ associated with the respective resource consumer $C_j$ and divided by a sum of all of the priority values of the resource consumers. In other words, the channel resource allocations $A_j$ may be given by:

$$A_j = \frac{CR \cdot R_j}{\sum_j R_j} \quad \text{(eq. 4)}$$

Table 1 illustrates an example allocation according to eq. 4 for three example resource consumers.

| Resource Consumer $C_j$ | Max Capability | Priority Number $R_j$ | Allocation $A_j$ (as a % of CR) |
|---|---|---|---|
| $C_1$ | MU-MIMO or OFDMA | 2 | 40% |
| $C_2$ | MU-MIMO or OFDMA | 2 | 40% |
| $C_3$ | SU-MIMO | 1 | 20% |

As another example, in a prioritization scheme in which lower priority values $R_j$ indicate higher prioritizations, then the channel resource allocation $A_j$ for each of the resource consumers $C_j$ may be equal to the total available channel resource CR divided by the product of the priority value $R_j$ associated with the respective resource consumer $C_j$ and a sum over all j of one divided by $R_j$. In other words, the channel resource allocations $A_j$ may be given by:

$$A_j = \frac{CR}{R_j \cdot \sum_j \frac{1}{R_j}} \quad \text{(eq. 5)}$$

Table 2 illustrates an example allocation according to eq. 5 for three example resource consumers.

| Resource Consumer $C_j$ | Max Capability | Priority Number $R_j$ | Allocation $A_j$ (as a % of CR) |
|---|---|---|---|
| $C_1$ | MU-MIMO or OFDMA | 1 | 43% |
| $C_2$ | MU-MIMO | 1.2 | 36% |
| $C_3$ | SU-MIMO | 2 | 21% |

As another example, in MA-aware channel access policies that include an equal usage policy, the channel resource allocations $A_j$ may be determined to be equal proportions of the b total available channel resource CR. For example, the channel resource allocations $A_j$ may be given by:

$$A_j = CR/\text{count}(C) \quad \text{(eq. 6)}$$

where count(C) is the total number of resource consumers. The same allocations obtained via equation 6 may also be obtained via equations 4 or 5 by setting the same priority values $R_j$ for all of the resource consumers $C_j$.

In equations 4-6 above, the total available channel resource CR is used as a base amount of which the allocation $A_j$ is a fraction or proportion. Equations 4-6 as described above may be used, for example, when it is desired for the allocations $A_j$ to be fractions of the total available channel resource CR. However, in certain circumstance it may be desired to determine an allocation $A_j$ that is a fraction of another allocation rather than of CR—for example, in certain circumstances in which allocations $A_j$ are being determined for VAPs and client devices, it may be desired to have the allocations $A_j$ of client devices be fractions of the allocations $A_j$ of the VAPs to which the client devices are connected. In such examples, the allocations $A_j$ of the VAPs may be determined using any of equations 4-6 as described above, and then the allocations $A_j$ of the client devices may be determined via modified versions of equations 4-6 in which CR is replaced with the allocation $A_j$ of the VAP to which the client device is connected. For example, table 3 illustrates an example in which allocations A % for VAPs are determined based on CR and allocations $A_j$ for client devices are determined based on the allocations A of their respective VAPs.

| Resource Consumer $C_j$ | Connected to VAP | Max Capability | Priority Number $R_j$ | Allocation $A_j$ |
|---|---|---|---|---|
| $C_1$ (VAP) | n/a | MU-MIMO or OFDMA | 2 | 50% · CR |
| $C_2$ (VAP) | n/a | MU-MIMO or OFDMA | 1 | 25% · CR |
| $C_3$ (VAP | n/a | MU-MIMO or OFDMA | 1 | 25% · CR |
| $C_4$ | $C_1$ | MU-MIMO | 2 | 67% · $A_1$ = 34% CR |
| $C_5$ | $C_1$ | SU-MIMO | 1 | 33% · $A_1$ = 16% · CR |
| $C_6$ | $C_2$ | MU-MIMO or OFDMA | 3 | 60% · $A_2$ = 15% · CR |
| $C_7$ | $C_2$ | MU-MIMO | 2 | 40% · $A_2$ = 10% · CR |
| $C_8$ | $C_3$ | MU-MIMO or OFDMA | 3 | 75% · $A_3$ = 19% · CR |
| $C_9$ | $C_3$ | SU-MIMO | 1 | 25% · $A_3$ = 6% · CR |

The process flow diagrams in FIGS. 3-5 and the descriptions herein are presented to aid the understanding of the example processes, but are not intended to be exhaustive descriptions thereof. For example, the example processes could include additional operations besides those illustrated in the Figures and described herein. As another example, the example processes could omit certain operations illustrated in the Figures and described herein. Furthermore, the operations are illustrated in a particular order for ease of description, but in practice some operations may be performed concurrently and/or in a different order than that illustrated. In addition, certain operations that were described separately for ease of understanding may, in practice, be performed together as part of a single operation.

Figure 6:
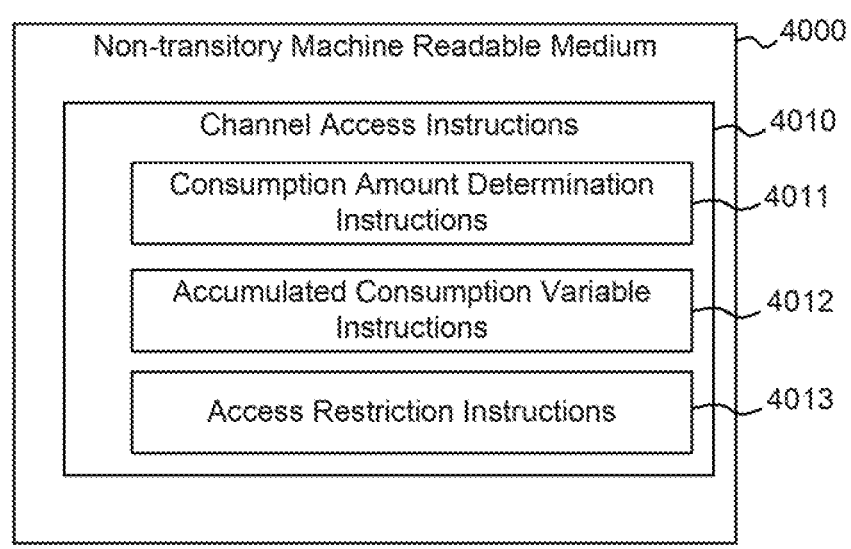
FIG. 6 is a block diagram illustrating an example non-transitory machine readable medium storing example access control instructions.

FIG. 6 illustrates an example non-transitory machine readable medium 4000 that stores channel access instructions 4010. The machine readable medium 4000 may include any non-transitory media that can store instructions and is readable by a machine, such as a memory device (e.g., RAM, persistent memory, USB drive, etc.), a hard disk drive, a solid-state drive, an optical disk (e.g., CD, DVD, Blu-ray, etc.), a magnetic disk, and the like.

The channel access instructions 4010 may include instructions that are of such a nature that when they are executed by processing circuitry of a wireless access point (such as the processing circuitry 121) of a rack-scale system (such as the rack-scale system 10), they cause the processing circuitry to perform the operations described above in relation to the example processes 1000, 2000, and/or 3000. For example, the channel access instructions 4010 may include a consumption amount determination instructions 4011, accumulated consumption variable instructions 4012, and access restriction instructions 4013.

The consumption amount determination instructions 4011 may include instructions to, for wireless communications $S_i$ of the wireless access point, determine a channel-resource-consumption amount $U_i$ for the respective wireless communication $S_i$ based on a number N of spatial streams effectively consumed by the respective wireless communication $S_i$, an operational bandwidth W effectively consumed by the respective wireless communication $S_i$, and a duration T of the respective wireless communication $S_i$. For example, the consumption amount determination instructions 4011 may include instructions corresponding to operations 1002-1004 of the example process 1000 described above and illustrated in FIG. 3. The consumption amount determination instructions 4011 may include instructions corresponding to the operations of the example process 2000 described above and illustrated in FIG. 4.

The accumulated consumption variable instructions 4012 may include instructions to associate accumulated-channel-resource-consumption variables $\Sigma U_j$ with, respectively, resource consumers $C_j$ of the wireless access point. The accumulated consumption variable instructions 4012 may also include instructions to, for each wireless communication $S_i$, add the channel-resource-consumption amount $U_i$ of the respective wireless communication $S_i$ to the accumulated-channel-resource-consumption variable $\Sigma U_j$ of the one of the resource consumers $C_j$ that is associated with the respective wireless communication $S_i$. For example, the consumption amount determination instructions 4011 may include instructions corresponding to operations 1001 and 1005 of the example process 1000 described above and illustrated in FIG. 3.

The access restriction instructions 4013 may include instructions to determine whether to impose channel access restrictions on the resource consumers $C_j$ based on their respective accumulated-channel-resource-consumption variables $\Sigma U_j$. For example, the consumption amount determination instructions 4011 may include instructions corresponding to operations 1006 of the example process 1000 described above and illustrated in FIG. 3. The access restriction instructions 4013 may also include instructions corresponding to the operations of the example process 3000 described above and illustrated in FIG. 5.

As used herein, "access point" (AP) refers generally to transmitting and/or receiving points for any known or convenient wireless access technology which is now or may later become known. Specifically, although the term AP may include IEEE 802.11-based APs, the term AP is not intended to be limited solely to IEEE 802.11-based APs. APs generally function as an electronic device that is adapted to allow devices to wirelessly connect to a network via various communications standards.

As used herein, a "processor" may include any logic circuitry that is capable of executing machine readable instructions stored in a non-transitory machine-readable medium (such as the storage 123, an optical disk, a magnetic disk, etc). For example, a "processor" (such as a processor of the processing circuitry 121) may be, for example, a central processing unit (CPU), a microprocessor, a microcontroller, a digital signal processor (DSP), etc.

As used herein, a "coprocessor" is a processor that is configured to supplement the functions of a primary processor. In certain examples, a coprocessor may be controlled by coprocessor instructions that are part of a primary processor's instruction stream. In other examples, a coprocessor may be independent of and capable of working asynchronously with the primary processor.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

While the above disclosure has been shown and described with reference to the foregoing examples, it should be understood that other forms, details, and implementations may be made without departing from the spirit and scope of this disclosure.

For example, the disclosure includes at least the following configurations:

(1) A non-transitory machine readable medium comprising processor executable instructions for controlling a wireless access point, including instructions to:
  associate accumulated-channel-resource-consumption variables with, respectively, resource consumers of the wireless access point;
  for wireless communications of the wireless access point,
    determine a channel-resource-consumption amount for the respective wireless communication based on a number of spatial streams effectively consumed by the respective wireless communication, an operational bandwidth effectively consumed by the respective wireless communication, and a duration of the respective wireless communication, and
    add the channel-resource-consumption amount of the respective wireless communication to the accumulated-channel-resource-consumption variable of one of the resource consumers that is associated with the respective wireless communication; and
  determine whether to impose channel access restrictions on the resource consumers based on their respective accumulated-channel-resource-consumption variables.

(2) The non-transitory machine readable medium of (1), wherein, for each of the wireless communications, the channel-resource-consumption amount is equal to the number of spatial streams effectively consumed by the respective wireless communication multiplied by the operational bandwidth effectively consumed by the respective wireless communication multiplied by the duration of the respective wireless communication.

(3) The non-transitory machine readable medium of (1), further comprising instructions to:
  for each of the wireless communications:
    determine the number of spatial streams effectively consumed by the respective wireless communication to be:
      a number of spatial streams actually used by the respective communication if the respective wireless communication was a multi-user-multi-input-multi-output (MU-MIMO) communication, and
      a maximum number of spatial streams for the wireless access point otherwise,
    determine the operational bandwidth effectively consumed by the respective wireless communication to be:
      a bandwidth actually used by the respective communication if the respective wireless communication was a orthogonal-frequency-division-multiple-access (OFDMA) communication, and
      a maximum operational bandwidth for the wireless access point otherwise.

(4) The non-transitory machine readable medium of (1), further comprising instructions to:
  determine a channel resource allocation for each of the resource consumers; and
  determine whether to impose channel access restrictions on the resource consumers based on how their respective accumulated-channel-resource-consumption variables compare to their respective channel resource allocations.

(5) The non-transitory machine readable medium of (4), further comprising instructions to:
  determine a total available channel resource for the wireless access point equal to a maximum number of spatial streams for the wireless access point multiplied by a maximum operation bandwidth for the wireless access point multiplied by a duration of a channel-access time period; and determine the channel resource allocation for each of the resource consumers based on the total available channel resource.

(6) The non-transitory machine readable medium of (5), further comprising instructions to:
  determine the channel resource allocation for each of the resource consumers based on a priority value associated with the respective resource consumer.

(7) The non-transitory machine readable medium of (6), further comprising instructions to:
  determine the channel resource allocation for each of the resource consumers to be equal to the total available channel resource multiplied by the priority value associated with the respective resource consumer and divided by a sum of all of the priority values associated with the resource consumers.

(8) The non-transitory machine readable medium of claim (1), further comprising instructions to:
  for each of the wireless communications, determine the number of spatial streams effectively consumed by the respective wireless communication to be:
    a number of spatial streams actually used by the respective communication if the respective wireless communication was a multi-user-mult-input-multi-output (MU-MIMO) communication, and
    a maximum number of spatial streams for the wireless access point otherwise, (9) The non-transitory machine readable medium of (1), further comprising instructions to:
  for each of the wireless communications, determine the operational bandwidth effectively consumed by the respective wireless communication to be:
    a bandwidth actually used by the respective communication if the respective wireless communication was a orthogonal-frequency-division-multiple-access (OFDMA) communication, and
    a maximum operational bandwidth for the wireless access point otherwise.

(10) A wireless access point comprising:
  processing circuitry, and
  a non-transitory machine readable medium comprising channel-resource-access instructions executable by the processing circuitry, including instructions to:
    determine channel-resource-consumption amounts for wireless communications of the wireless access point based on: a number of spatial streams effectively consumed by the respective wireless communication, an operational bandwidth effectively consumed by the respective wireless communication, and a duration of the respective wireless communication;
    determine values for accumulated-channel-resource-consumption variables associated, respectively, with resource consumers of the access point by accumulating the channel-resource-consumption amounts per resource consumer; and
    determine whether to impose channel access restrictions on the resource consumers based on their respective accumulated-channel-resource-consumption variables.

(11) The wireless access point of (10), wherein the channel-resource-consumption amount of each of the wireless communications is equal to the number of spatial streams effectively consumed by the respective wireless communication multiplied by the operational bandwidth effectively consumed by the respective wireless communication multiplied by the duration of the respective wireless communication.

(12) The wireless access point of (10), wherein the channel-resource-access instructions include instructions to:

for each of the wireless communications:
  determine the number of spatial streams effectively consumed by the respective wireless communication to be:
    a number of spatial streams actually used by the respective communication if the respective wireless communication was a multi-user-multi-input-multi-output (MU-MIMO) communication, and
    a maximum number of spatial streams for the wireless access point otherwise,
  determine the operational bandwidth effectively consumed by the respective wireless communication to be:
    a bandwidth actually used by the respective communication if the respective wireless communication was a orthogonal-frequency-division-multiple-access (OFDMA) communication, and
    a maximum operational bandwidth for the wireless access point otherwise.

(13) The wireless access point of (10), wherein the channel-resource-access instructions include instructions to:
  determine a channel resource allocation for each of the resource consumers; and
  determine whether to impose channel access restrictions on the resource consumers based on how their respective accumulated-channel-resource-consumption variables compare to their respective channel resource allocations.

(14) The wireless access point of (13), wherein the channel-resource-access instructions include instructions to:
  determine a total available channel resource for the wireless access point equal to a maximum number of spatial streams for the wireless access point multiplied by a maximum operation bandwidth for the wireless access point multiplied by a duration of a channel-access time period; and
  determine the channel resource allocation for each of the resource consumers based on the total available channel resource.

(15) The wireless access point of (10), wherein the channel-resource-access instructions include instructions to:
  for each of the wireless communications, determine the number of spatial streams effectively consumed by the respective wireless communication to be:
    a number of spatial streams actually used by the respective communication if the respective wireless communication was a multi-user-multi-input-multi-output (MU-MIMO) communication, and
    a maximum number of spatial streams for the wireless access point otherwise,

(16) The wireless access point of (10), wherein the channel-resource-access instructions include instructions to:
  for each of the wireless communications, determine the operational bandwidth effectively consumed by the respective wireless communication to be:
    a bandwidth actually used by the respective communication if the respective wireless communication was a orthogonal-frequency-division-multiple-access (OFDMA) communication, and
    a maximum operational bandwidth for the wireless access point otherwise.

(17) A method of controlling a wireless access point, comprising: associating accumulated-channel-resource-consumption variables with, respectively, resource consumers of the wireless access point;
  for wireless communications of the wireless access point:
    determining a number of spatial streams effectively consumed by the respective wireless communication;
    determining an operational bandwidth effectively consumed by the respective wireless communication;
    determining a duration of the respective wireless communication;
    determining a channel-resource-consumption amount for the respective wireless communication based on the number of spatial streams effectively consumed by the respective wireless communication, the operational bandwidth effectively consumed by the respective wireless communication, and the duration of the respective wireless communication; and
  determining values for the accumulated-channel-resource-consumption variables by accumulating the channel-resource-consumption amounts per resource consumer; and
  determining whether to impose channel access restrictions on the resource consumers based on their respective accumulated-channel-resource-consumption variables.

(18) The method of (17), further comprising:
  for those for the wireless communications that are multi-user-multi-input-multi-output (MU-MIMO) communications, determining the number of spatial streams effectively consumed by the respective wireless communication to be a number of spatial streams actually used by the respective communication; and
  for those for the wireless communications that are not MU-MIMO communications, determining the number of spatial streams effectively consumed by the respective wireless communication to be a maximum number of spatial streams for the wireless access point.

(19) The method of (17), further comprising:
  for those for the wireless communications that are orthogonal-frequency-division-multiple-access (OFDMA) communications, determining the operational bandwidth effectively consumed by the respective wireless communication to be a bandwidth actually used by the respective communication; and
  for those for the wireless communications that are not OFDMA communications, determining the operational bandwidth effectively consumed by the respective wireless communication to be a maximum operational bandwidth for the wireless access point.

(20) The method of (17), further comprising:
  for those for the wireless communications that are multi-user-multi-input-multi-output (MU-MIMO) communications, determining the number of spatial streams effectively consumed by the respective wireless communication to be a number of spatial streams actually used by the respective communication;
  for those for the wireless communications that are not MU-MIMO communications, determining the number of spatial streams effectively consumed by the respective wireless communication to be a maximum number of spatial streams for the wireless access point;
  for those for the wireless communications that are orthogonal-frequency-division-multiple-access (OFDMA) communications, determining the operational bandwidth effectively consumed by the respective wireless communication to be a bandwidth actually used by the respective communication; and
  for those for the wireless communications that are not OFDMA communications, determining the operational bandwidth effectively consumed by the respective wireless communication to be a maximum operational bandwidth for the wireless access point.

The invention claimed is:
1. A non-transitory machine readable medium comprising processor executable instructions for controlling a wireless access point, including instructions to:

associate accumulated-channel-resource-consumption amounts with, respectively, resource consumers of the wireless access point;

for wireless communications of the wireless access point, determine a channel-resource-consumption amount for the respective wireless communication based on a number of spatial streams effectively consumed by the respective wireless communication, an operational bandwidth effectively consumed by the respective wireless communication, and a duration of the respective wireless communication, and add the channel-resource-consumption amount of the respective wireless communication to the accumulated-channel-resource-consumption amounts of one of the resource consumers that is associated with the respective wireless communication; and determine whether to impose channel access restrictions on the resource consumers based on their respective accumulated-channel-resource-consumption amounts.

2. The non-transitory machine readable medium of claim 1,
wherein, for each of the wireless communications, the channel-resource-consumption amount is equal to the number of spatial streams effectively consumed by the respective wireless communication multiplied by the operational bandwidth effectively consumed by the respective wireless communication multiplied by the duration of the respective wireless communication.

3. The non-transitory machine readable medium of claim 1, further comprising instructions to:
determine a total available channel resource for the wireless access point equal to a maximum number of spatial streams for the wireless access point multiplied by a maximum operation bandwidth for the wireless access point multiplied by a duration of a channel-access time period;
determine a channel resource allocation for each of the resource consumers based on the total available channel resource, and
determine whether to impose channel access restrictions on the resource consumers based on how their respective accumulated-channel-resource-consumption amounts compare to their respective channel resource allocations.

4. The non-transitory machine readable medium of claim 3, further comprising instructions to:
determine the channel resource allocation for each of the resource consumers based on a priority value associated with the respective resource consumer.

5. The non-transitory machine readable medium of claim 4, further comprising instructions to:
determine the channel resource allocation for each of the resource consumers to be equal to the total available channel resource multiplied by the priority value associated with the respective resource consumer and divided by a sum of all of the priority values associated with the resource consumers.

6. The non-transitory machine readable medium of claim 1, further comprising instructions to:
for each of the wireless communications, determine the number of spatial streams effectively consumed by the respective wireless communication to be:
a number of spatial streams used by the respective wireless communication if the respective wireless communication was a multi-user-multi-input-multi-output (MU-MIMO) communication, or
a maximum number of spatial streams for the wireless access point if the respective wireless communication was not a MU-MIMO communication.

7. The non-transitory machine readable medium of claim 1, further comprising instructions to:
for each of the wireless communications, determine the operational bandwidth effectively consumed by the respective wireless communication to be:
a bandwidth used by the respective wireless communication if the respective wireless communication was a orthogonal-frequency-division-multiple-access (OFDMA) communication, or
a maximum operational bandwidth for the wireless access point if the respective wireless communication is not an OFDMA communication.

8. A wireless access point comprising:
processing circuitry, and
a non-transitory machine readable medium comprising channel-resource-access instructions executable by the processing circuitry, including instructions to:
determine channel-resource-consumption amounts for wireless communications of the wireless access point based on: a number of spatial streams effectively consumed by the respective wireless communication, an operational bandwidth effectively consumed by the respective wireless communication, and a duration of the respective wireless communication;
determine values for accumulated-channel-resource-consumption amounts associated, respectively, with resource consumers of the access point by accumulating the channel-resource-consumption amounts per resource consumer; and
determine whether to impose channel access restrictions on the resource consumers based on their respective accumulated-channel-resource-consumption amounts.

9. The wireless access point of claim 8,
wherein the channel-resource-consumption amount of each of the wireless communications is equal to the number of spatial streams effectively consumed by the respective wireless communication multiplied by the operational bandwidth effectively consumed by the respective wireless communication multiplied by the duration of the respective wireless communication.

10. The wireless access point of claim 8, wherein the channel-resource-access instructions include instructions to:
determine a total available channel resource for the wireless access point equal to a maximum number of spatial streams for the wireless access point multiplied by a maximum operation bandwidth for the wireless access point multiplied by a duration of a channel-access time period;
determine a channel resource allocation for each of the resource consumers based on the total available channel resource, and
determine whether to impose channel access restrictions on the resource consumers based on how their respective accumulated-channel-resource-consumption amounts compare to their respective channel resource allocations.

11. The wireless access point of claim 8, wherein the channel-resource-access instructions include instructions to:
for each of the wireless communications, determine the number of spatial streams effectively consumed by the respective wireless communication to be:

a number of spatial streams actually used by the respective wireless communication if the respective wireless communication was a multi-user-multi-input-multi-output (MU-MIMO) communication, or a maximum number of spatial streams for the wireless access point if the respective wireless communication was not a MU-MIMO communication.

12. The wireless access point of claim 8, wherein the channel-resource-access instructions include instructions to:

for each of the wireless communications, determine the operational bandwidth effectively consumed by the respective wireless communication to be:

a bandwidth used by the respective wireless communication if the respective wireless communication was a orthogonal-frequency-division-multiple-access (OFDMA) communication, or a maximum operational bandwidth for the wireless access point if the respective wireless communication is not an OFDMA communication.

13. A method of controlling a wireless access point, comprising:

associating accumulated-channel-resource-consumption amounts with, respectively, resource consumers of the wireless access point;

for wireless communications of the wireless access point:
determining a number of spatial streams effectively consumed by the respective wireless communication;
determining an operational bandwidth effectively consumed by the respective wireless communication;
determining a duration of the respective wireless communication;
determining a channel-resource-consumption amount for the respective wireless communication based on the number of spatial streams effectively consumed by the respective wireless communication, the operational bandwidth effectively consumed by the respective wireless communication, and the duration of the respective wireless communication; and determining values for the accumulated-channel-resource-consumption amounts by accumulating the channel-resource-consumption amounts per resource consumer; and determining whether to impose channel access restrictions on the resource consumers based on their respective accumulated-channel-resource-consumption amounts.

14. The method of claim 13, further comprising:

for those for the wireless communications that are multi-user-multi-input-multi-output (MU-MIMO) communications, determining the number of spatial streams effectively consumed by the respective wireless communication to be a number of spatial streams actually used by the respective communication; and for those for the wireless communications that are not MU-MIMO communications, determining the number of spatial streams effectively consumed by the respective wireless communication to be a maximum number of spatial streams for the wireless access point.

15. The method of claim 13, further comprising:

for those for the wireless communications that are orthogonal-frequency-division-multiple-access (OFDMA) communications, determining the operational bandwidth effectively consumed by the respective wireless communication to be a bandwidth used by the respective communication; and for those for the wireless communications that are not OFDMA communications, determining the operational bandwidth effectively consumed by the respective wireless communication to be a maximum operational bandwidth for the wireless access point.

* * * * *